United States Patent
Franz et al.

[11] Patent Number: 5,496,383
[45] Date of Patent: Mar. 5, 1996

[54] FUEL ADDITIVES, THEIR PREPARATION AND GASOLINE ENGINE FUELS CONTAINING THE ADDITIVES

[75] Inventors: Lothar Franz, Mutterstadt; Juergen Mohr, Gruenstadt; Peter Schreyer, Weinheim; Juergen Thomas, Fussgoenheim; Knut Oppenlaender, Ludwigshafen; Wolfgang Guenther, Mettenheim, all of Germany

[73] Assignee: BASF Aktiengesellschaft, Ludwigshafen, Germany

[21] Appl. No.: 208,819

[22] Filed: Mar. 11, 1994

[30] Foreign Application Priority Data

Mar. 23, 1993 [DE] Germany ............... 43 09 271.3

[51] Int. Cl.⁶ ................................ C10L 1/22
[52] U.S. Cl. .................. 44/432; 525/333.7; 525/382
[58] Field of Search .................. 44/432; 525/333.7, 525/382

[56] References Cited

U.S. PATENT DOCUMENTS

| | | | |
|---|---|---|---|
| 3,565,954 | 2/1971 | Bouniot | 564/472 |
| 4,357,148 | 11/1982 | Graiff | 44/432 |
| 4,823,825 | 4/1989 | Buchl | |
| 4,832,702 | 5/1989 | Kummer et al. | 44/62 |
| 4,859,210 | 8/1989 | Franz et al. | 44/432 |
| 5,124,484 | 6/1992 | Brown et al. | 564/472 |
| 5,340,881 | 8/1994 | Kennedy et al. | 525/333.7 |

FOREIGN PATENT DOCUMENTS

| | | |
|---|---|---|
| 1003442 | 1/1977 | Canada . |
| 205807 | 11/1989 | European Pat. Off. . |
| 2245918 | 9/1972 | Germany . |
| 2136438 | 9/1984 | United Kingdom . |

OTHER PUBLICATIONS

M. Rossenbeck, Additive fur Kraftstoffe, p. 223, G. Thieme Verlag Stuttgart 1978 (month unavailable).

*Primary Examiner*—Jacqueline V. Howard
*Attorney, Agent, or Firm*—Keil & Weinkauf

[57] ABSTRACT

Halogen-free fuel additives based on a long-chain hydrocarbon having a polar terminal group are obtained by reacting a hydroformylated olefin with a polyamine and hydrogenating the reaction product.

7 Claims, No Drawings

FUEL ADDITIVES, THEIR PREPARATION AND GASOLINE ENGINE FUELS CONTAINING THE ADDITIVES

The present invention relates to fuel additives based on a long-chain hydrocarbon having a polar terminal group, a process for the preparation of these additives, in which an olefin is first hydroformylated and the reaction product is then reacted with a polyamine and finally hydrogenated, azomethines which are obtained in the preparation of the fuel additives, and fuels which contain these additives.

Carburettors and intake systems of gasoline engines as well as injection systems for fuel metering in gasoline and diesel engines are increasingly being contaminated by impurities due to dust particles in the air, uncombusted hydrocarbon residues from the combustion chamber and crankcase vent gases passed into the carburettor.

These residues shift the air/fuel ratio during idling and in the lower part-load range so that the mixture becomes richer and the combustion more incomplete and in turn the proportions of uncombusted or partially combusted hydrocarbons in the exhaust gas become larger and the gasoline consumption increases.

It is known that these disadvantages can be avoided by using fuel additives to keep valves and carburettors or injection systems clean (cf. for example: M. Rossenbeck in Katalysatoren, Tenside, Mineralöl-additive, Editors J. Falbe and U. Hasserodt, page 223, G. Thieme Verlag, Stuttgart 1978).

Depending on the mode of action but also on the preferred site of action of such detergent additives, a distinction is now made between two generations.

The first generation of additives were able only to prevent the formation of deposits in the intake system but unable to remove existing deposits, whereas the modern additives of the second generation can do both (keep-clean and clean-up effect), particularly in zones of high temperatures, ie. at the intake valves, owing to the excellent heat stability of said additives.

The molecular structure of these additives which act as detergents may generally be said to consist of the linking of polar structures with, generally, higher molecular weight, nonpolar or oleophilic radicals.

Many typical members of the second generation of additives are products based on polyisobutenes in the nonpolar moiety. Here in turn, additives of the polyisobutylamine type are particularly noteworthy.

Detergents of the polyisobutylamine type are obtained starting from polyisobutenes, essentially by two processes.

The first process takes place via a chlorination of the polymeric parent substance and subsequent nucleophilic substitution of the halogen by amines or, preferably, ammonia (German Laid-Open Application DOS 2,245,918). The disadvantage of this process is the use of chlorine and the occurrence of chlorine- or chloride-containing products, which are now by no means desirable and as far as possible are avoided.

In the second process, a reactive polyisobutene is first hydroformylated in an oxo synthesis and then hydrogenated under aminating conditions in the presence of amines (German Laid-Open Application DOS 3,611,220).

If ammonia is used in the hydrogenation under aminating conditions in this second process, the reaction products of the ammonia generally have a very efficient keep-clean effect in valves and carburettors but show neutral behavior in their effect on an engine lubricant, in particular with regard to their sludge dispersing.

Substances which combine the properties of both detergents and dispersants are therefore of particular technical interest.

It is known that reaction products with polyamines can have these properties. However, depending on the preparation, such polyamine reaction products either exhibit the abovementioned disadvantage of the halogen content or, if they are prepared by the second process, troublesome byproducts may form from the polyamines used in the amination under hydrogenating conditions.

It is an object of the present invention to provide fuel additives which have both a good keep-clean effect with regard to valves and carburettors and a good effect in terms of oil sludge dispersing, and which furthermore are free of halogen impurities and in whose preparation no polyamine condensation byproducts are formed.

We have found that this object is achieved by fuel additives based on a long-chain hydrocarbon having a polar terminal group, which is obtainable by a) hydroformylating a long-chain olefin having a number average molecular weight of from 250 to 5,000 in the presence of CO and $H_2$ at from 80° to 200° C. and $CO/H_2$ pressures of up to 600 bar, b) reacting the reaction product with a polyamine of the following formula I

where m is 1–10, $R^1$ is branched or straight-chain alkylene of 2 to 6 carbon atoms and the radicals $R^1$ may be different from one another when m is >1, $R^2$ and $R^3$ independently of one another are each hydrogen, alkyl of 1 to 6 carbon atoms or hydroxyalkyl of 1 to 6 carbon atoms, or $R^2$ and $R^3$, together with the nitrogen to which they are bonded, form a heterocyclic ring which may have further heteroatoms, and then c) catalytically hydrogenating the resulting reaction product in the presence of hydrogen and in the presence or absence of $NH_3$.

In the preparation of the fuel additives, azomethines (Schiff's bases) of the general formula II

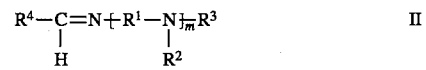

where $R^4$ is an aliphatic hydrocarbon radical having alkyl side groups and a number average molecular weight of from 250 to 5,000 and $R^1$, $R^2$, $R^3$ and m have the abovementioned meanings, occur as intermediates in reaction step b).

These azomethines can also be used as fuel additives.

For the preparation of the fuel additives, polyisobutenes which are derived from isobutene and 0 to 30% by weight of n-butene are preferably used as olefins.

N,N-Dialkylalkylenepolyamines, such as N,N-dimethylpropylenediamine and N,N-dimethyldiethylenetriamine, polyalkylenepolyamines, such as ethylenediamine, diethylenetriamine, triethylenetetramine, tetraethylenepentamine, dipropylenetriamine, ethylenepropylenetriamine and ethylenedipropylenetetramine, and industrial mixtures of oligoethylenepolyamines, N-hydroxyalkylalkylenepolyamines, e.g. aminoethylethanolamine (N-hydroxyethylethylenediamine), and polyamines containing an N-heterocycle, such as aminoethylpiperazine, can be used as polyamines for the preparation of the fuel additives according to the invention.

Preferably used polyamines of the general formula I are compounds in which $R^1$ is ethylene, $R^2$ and $R^3$ are each hydrogen and m is 1–5.

Ethylenediamine, diethylenetriamine, triethylenetetramine and tetraethylenepentamine are very particularly preferred.

The novel fuel additives are obtained by the hydroformylation of corresponding poly- or oligo-olefins and subsequent reaction of the resulting carbonyl compounds (predominantly aldehydes) with the polyamines, followed by hydrogenation of the Schiff's bases formed as intermediates.

For this purpose, for example, a polyisobutene is subjected to hydroformylation, an aldehyde being formed which is subsequently reacted with a polyamine with formation of the Schiff's base. The alcohol also formed in the hydroformylation does not interfere with the further reaction and may remain in the reaction mixture. The azomethines are then subjected to a catalytic hydrogenation with hydrogen to give the amine derivatives. In a variant of this reaction, the reduction is carried out in the presence of ammonia.

The olefin used (e.g. polyisobutene) has a molecular weight of from 250 to 5,000, preferably from 800 to 1,500. It is obtained by cationic polymerization of, for example, isobutene by a known method, a double bond which can be used for further functionalization being generated after termination of the polymer chain, in the monomer last incorporated (cf. for example German Laid-Open Application DOS 2,702,604).

The hydroformylation according to reaction step a) is carried out in a conventional manner, as also described in German Laid-Open Application DOS 3,611,220. The reaction of the hydroformylation reaction product with the polyamine after the hydroformylation catalysts have been separated off (reaction step b)) is preferably effected in a solvent with which water can be removed azeotropically from the reaction mixture. An example of a suitable solvent is cyclohexane. The hydrogenation according to reaction step c) is carried out similarly to known hydrogenations, and the catalyst used may be the conventional ones, for example Raney nickel or Raney cobalt. The hydrogenatoin is usually carried out in an autoclave under pressure at from 50° to 300° C. If the hydrogenation is effected in the presence of $NH_3$, it is possible to convert the alcohols formed as byproducts into amines.

The fuel additives obtained in the above process are not only efficient detergents in the intake system but also have dispersant properties in the engine oil, whereas the conventional polyisobutylamines exhibit at best neutral behavior toward oil sludge.

Owing to their properties as detergents and dispersants, the novel fuel additives are used in fuels, in particular in fuels for gasoline engines. However, they may also be used in lubricants.

If the additives are used in fuels, they are preferably added in an amount of from 10 to 5,000 ppm, in particular from 50 to 1,000 ppm. As a rule, larger amounts of additives must be added to lubricants.

If it is intended primarily to utilize the dispersing properties of the novel additives, they may also be combined with conventional detergents as additional additives.

In principle, any known products suitable for this purpose, as described, for example, by J. Falbe and U. Hasserodt, Katalysatoren, Tenside und Mineralöl-additive, G. Thieme Verlag Stuttgart 1978, page 221 et seq., or by K. Owen, Gasoline and Diesel Fuel Additives, John Wiley & Sons 1989, page 23 et seq., can be used as the detergent component in the mixture containing the novel additives as dispersants.

N-Containing detergents, for example compounds which contain an amino or amido group, are preferably used. Polyisobutylamines according to EP 0 224 616, ethylenediaminetetraacetamides and/or ethylenediamineteraacetimides according to EP 0 188 786 or polyetheramines according to EP 0 356 725 are particularly suitable, reference being made to the definitions in these publications. Owing to their method of preparation, the products described there likewise have the advantage of being chlorine-free and chloride-free.

If it is intended primarily to utilize the detergent effect of the novel additives, these additives may also be combined with carrier oils. Such carrier oils are known, and polyglycol-based carrier oils, for example corresponding ethers and/or esters as described in U.S. Pat. No. 5,004,478 or DE 38 38 918 A1, are particularly suitable. Polyoxyalkylenemonools having terminal hydrocarbon groups (U.S. Pat. No. 4,877,416) or carrier oils as disclosed in DE 41 42 241.4 may also be used.

Suitable fuels for gasoline engines are leaded and in particular unleaded regular and premium-grade gasoline. The gasolines may contain components other than hydrocarbons, for example alcohols, such as methanol, ethanol or tert-butanol, and ethers, e.g. methyl tert-butyl ether. In addition to the additives to be used according to the invention, the fuels generally contain further additives, such as corrosion inhibitors, stabilizers, antioxidants and/or further detergents.

Corrosion inhibitors are generally ammoniumsalts of organic carboxylic acids, which tend to form films because the starting compounds have the appropriate structure. Amines for reducing the pH are also frequently used in corrosion inhibitors. Heterocyclic aromatics are generally used for protecting nonferrous metals against corrosion.

Testing of the novel fuel additives for suitability as valve cleaners was carried out in a VW Polo engine and, according to the DKA proposal, in a Mercedes-Benz M 102 E engine.

EXAMPLES

1. Preparation of the azomethines
1.1. Hydroformylation of the polyisobutene 500 g of polyisobutene (PIB) having a molecular weight $M_w$ of 950, 300 g of dodecane and 2.8 g of cobalt octacarbonyl were heated in a 2.5 l autoclave having a lift-type stirrer at 280 bar 1:1 $CO/H_2$ for 5 hours at 185° C. while stirring. Thereafter, the mixture was cooled to room temperature and the catalyst was removed with 400 ml of 10% strength aqueous acetic acid. Neutralization was then effected by washing. The product thus obtained contained in particular PIB aldehyde but also PIB alcohol.

1.2. Azomethine formation 0.5 mol of a polyamine according to Table 1 was added to 1.7 kg (1 mol) of the above PIB product. After the addition of 500 ml of cyclohexane, the water of reaction was separated off.

After reaction with diethylenetriamine as the polyamine component, the $^1$H-NMR signal for the (CH=N) group was at 7.45 ppm ($CDCl_3$).

2. Engine test

Keep-clean test for intake valves
Engine: Opel-Kadett 1.2 l (according to CEC F-04-A-87)
Fuel: European premium grade unleaded, additive dose 800 ppm The additive used was an azomethine prepared according to Example 1.1 and 1.2 using dimethylaminopropylamine as the polyamine component.

| Mixture | Deposit [mg], valve No. 1 | 2 | 3 | 4 | Mean value |
|---|---|---|---|---|---|
| Base value without additive | 447 | 262 | 21 | 667 | 349 |
| Fuel with azomethine | 5 | 5 | 3 | 2 | 4 |

The result clearly shows the valve-cleaning effect of the novel azomethine.

3. Hydrogenation of the azomethines 1 kg of the azomethine prepared according to 1) was reacted with the addition of 100 g of Raney nickel at 200° C. and 250 bar in an autoclave. The duration of the reaction was 4 hours. After the low boilers contained in the reaction mixture had been stripped off, the amine numbers stated in Table 1 were determined.

Amination of the azomethines under hydrogenating conditions was also carried out as an alternative to hydrogenation. Here, 500 g of the corresponding azomethine were reacted with 500 g of Raney nickel and 500 g of $NH_3$, likewise for 4 hours. Working up was carried out as for the hydrogenation.

| Amines used | Amine number after hydrogenation | Amino number after hydrogenation under aminating conditions |
|---|---|---|
| Ethylenediamine (EDA) | 21.5 | 34.7 |
| Aminoethylethanolamine (AEEA) | 28.2 | — |
| Diethylenetriamine (DETA) | 28.3 | 41.3 |
| Tetraethylenepentamine (TEPA) | 36.2 | — |

4. Engine test

Keep-clean test for intake valves 4.1. Engine: Mercedes-Benz M 102 E (according to DKA)
Fuel: European premium grade 169 unleaded, additive dose 600 ppm in each case

| Mixture | Deposit [mg], valve No. 1 | 2 | 3 | 4 | Mean value |
|---|---|---|---|---|---|
| Base value without additive Fuel with: | 341 | 330 | 369 | 229 | 317 |
| Polyisobutylamine (comparison) according to German Laid-Open Application DOS 3,611,230 | 14 | 0 | 5 | 20 | 10 |
| PIB-DETA, hydrogenated under aminating conditions | 3 | 0 | 7 | 10 | 5 |
| PIB-DETA, hydrogenated | 0 | 0 | 0 | 0 | 0 |
| PIB-EDA, hydrogenated | 0 | 0 | 8 | 9 | 4 |

The results clearly show that very good results are obtained with the novel additives with regard to valve cleaning.

4.2. Engine: VW Polo 1.05 l
Fuel: European premium grade 174 unleaded, additive dose 400 ppm in each case.

| Mixture | Deposit [mg], valve No. 1 | 2 | 3 | 4 | Mean value |
|---|---|---|---|---|---|
| Base value without additive Fuel with: | 182 | 112 | 115 | 103 | 129 |
| Polyisobutylamine according to German Laid-Open Application DOS 3,611,230 | 0 | 0 | 0 | 0 | 0 |
| PIB-EDA, hydrogenated | 0 | 0 | 0 | 0 | 0 |
| PIB-DETA, hydrogenated | 0 | 0 | 0 | 0 | 0 |
| PIB-TEPA, hydrogenated | 0 | 0 | 0 | 0 | 0 |

The results clearly show that the novel additives give results which are just as good as those obtained with the known PIBA but also have sludge-dispersing properties and are therefore advantageous in the overall properties.

We claim

1. A fuel additive based on a long-chain hydrocarbon having a polar terminal group, obtained by
   a) hydroformylating a long-chain olefin having a number average molecular weight of from 250 to 5,000 in the presence of CO and $H_2$ at from 80° to 200° C. and $CO/H_2$ pressures of up to 600 bar,
   b) reacting the reaction product with a polyamine of the following formula I

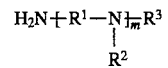    I where m is 1–10, $R^1$ is branched or straight-chain alkylene of 2 to 6 carbon atoms and the radicals $R^1$ may be different from one another when m is >1, $R^2$ and $R^3$ independently of one another are each hydrogen, alkyl of 1 to 6 carbon atoms or hydroxyalkyl of 1 to 6 carbon atoms, or $R^2$ and $R^3$, together with the nitrogen to which they are bonded, form a heterocyclic ring which may have further heteroatoms,
   and then
   c) catalytically hydrogenating the resulting reaction product in the presence of $H_2$ and in the presence or absence of $NH_3$.

2. A fuel additive as defined in claim 1, wherein the long-chain olefin is a polyisobutene derived from isobutene and from 0 to 30% by weight of n-butene.

3. A fuel additive as defined in claim 1, wherein, in the formula I, $R^1$ is ethylene, $R^2$ and $R^3$ are each hydrogen and m is 1–5.

4. A process for the preparation of a fuel additive which comprises:
   a) hydroformylating a long-chain olefin having a number average molecular weight of from 250 to 5,000 in the presence of CO and $H_2$ at from 80° to 200° C. and $CO/H_2$ pressures of up to 600 bar,
   b) reacting the reaction product of step a) with a polyamine of the formula I

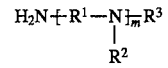    I where m is 1–10, $R^1$ is branched or straight-chain alkylene of 2 to 6 carbon atoms and the radicals $R^1$ may be different from one another when m is >1, $R^2$ and $R^3$ independently of one another are each hydrogen, alkyl of 1 to 6 carbon atoms or hydroxyalkyl of 1 to y carbon atoms, or $R^2$ and $R^3$, together with the nitrogen to which they are bonded, form a heterocyclic ring with may have further heteroatoms and then c) catalytically hydrogenating the resulting reaction product of step b) in the presence of $H_2$ and in the presence or absence of $NH_3$.

5. A process as defined in claim 4, wherein, in reaction step b), the reaction is carried out in an inert solvent.

6. A process as defined in claim 4, wherein, in reaction step c), hydrogenation is carried out at from 80° to 200° C. and at $H_2$ pressures of up to 600 bar.

7. A fuel for gasoline engines, which contains a fuel additive as defined in claim 1.

UNITED STATES PATENT AND TRADEMARK OFFICE
CERTIFICATE OF CORRECTION

PATENT NO.: 5,496,383

DATED: March 5, 1996

INVENTOR(S): FRANZ et al.

It is certified that error appears in the above-identified patent and that said Letters Patent is hereby corrected as shown below:

Column 6, claim 4, line 66, "with" should be --which--.

Signed and Sealed this

First Day of October, 1996

Attest:

BRUCE LEHMAN

Attesting Officer     Commissioner of Patents and Trademarks